United States Patent [19]

Yoda et al.

[11] 4,416,947
[45] Nov. 22, 1983

[54] MAGNETIC RECORDING MEDIUM

[75] Inventors: Kuniichi Yoda, Saku; Takehisa Ohkawa, Shimogoshi, both of Japan

[73] Assignee: TDK Electronics Co. Ltd., Tokyo, Japan

[21] Appl. No.: 364,053

[22] Filed: Mar. 31, 1982

[30] Foreign Application Priority Data

Apr. 1, 1981 [JP] Japan .................................. 56-47314

[51] Int. Cl.$^3$ .......................... G11B 5/70; H01F 10/02
[52] U.S. Cl. .................................. 428/447; 252/62.54; 360/134; 360/135; 360/136; 427/128; 428/694; 428/695; 428/900
[58] Field of Search ............... 428/694, 695, 900, 447; 252/62.54; 427/128; 360/134–136

[56] References Cited

U.S. PATENT DOCUMENTS

| | | | |
|---|---|---|---|
| 3,993,824 | 11/1976 | Shirahata | 428/900 |
| 4,110,503 | 8/1978 | Ogawa | 428/447 |
| 4,320,159 | 3/1982 | Ogawa | 428/695 |
| 4,349,608 | 9/1982 | Shimizu | 428/447 |

*Primary Examiner*—Ellis P. Robinson
*Attorney, Agent, or Firm*—Seidel, Gonda & Goldhammer

[57] ABSTRACT

A magnetic recording medium is provided which has smooth and stable running performances and is free of "squeal" phenomenon, especially in an environment of high temperature and high humidity. A highly viscous silicone oil having a viscosity of 100,000 centistokes or more is incorporated in combination with a higher fatty acid ester composed of a higher fatty having a melting point of 44° C. or more and a monohydric alcohol containing 3 to 8 carbon atoms into a magnetic coating layer of the magnetic recording medium. Such silicone oil is represented by the general formula:

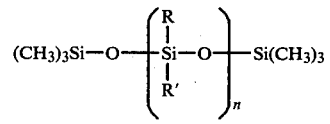

wherein R is $CH_3$, R' is $CH_3$, $C_6H_5$ or F and n is a number which determines a viscosity thereof. Such higher fatty acid ester is selected from butyl myristate, butyl palmitate, propyl stearate, butyl stearate and the like.

10 Claims, No Drawings

MAGNETIC RECORDING MEDIUM

BACKGROUND OF THE INVENTION

Field of the Invention

The present invention relates to a magnetic recording medium comprising a base film coated with an intimate mixture of magnetic powders in a binder, that is, to a magnetic recording tape suitable for sound or video recording or for use in electronic computers. More particularly, the invention relates to a magnetic recording medium which is free of "squeal" phenomenon when running as a magnetic recording tape and which provides smooth and stable running performances especially in an environment of high temperature and high humidity.

Description of the Prior Art

In general, when used with recording-reproducing devices such as a cassette tape deck, a magnetic recording tape runs in contact with magnetic heads, tape guides, pinch roller, capstan, etc. Therefore, the magnetic recording tape is required to possess a low friction coefficient as well as smooth and stable running performances. However, when the magnetic recording tape is running, a continuous phenomenon of stick-slip occurring alternately at the contacting portion of the magnetic coating layer with the magnetic heads or tape guides is sometimes observed. When this alternate stick-slip motion gradually intensifies, longitudinal vibrations of the tape will occur. These longitudinal vibrations are known as "stick-slip vibration" and are primarily responsible for the squeal phenomenon of the magnetic tape. Recently, this "squeal" phenomenon readily occurs because of the trend toward dense magnetic recording and magnetic tapes such as audio cassette tapes are designed for low running speed (4.75 cm/sec.) and frequency in use of thinner tapes (thickness 6 to 18 $\mu$m) has become high.

In order to ensure stable running properties of these magnetic tapes, it has been conventional practice to incorporate into the magnetic coating material, besides, a binder, any of various lubricants such as higher fatty acids or their derivatives, liquid paraffin, castor oil, fluorine oil, molybdenum disulfide, powdered graphite, etc. However, none of these lubricants can provide adequate lubricity to the magnetic tape. Particularly, they are unsatisfactory for ensuring stable running performance and preventing the squeal phenomenon of the tape in an environment of high temperature and high humidity (for example, a temperature of 40° to 60° C. and a relative humidity of 70 to 80%). The present invention has as its object the provision of a magnetic recording medium which obviates the above mentioned drawbacks of the prior art.

Summary of the Invention

It has now been found that such object can be attained by incorporating into the magnetic coating layer of a magnetic tape a combination of a highly viscous silicone oil having a viscosity of 100,000 centistokes or more with a higher fatty acid ester composed of a higher fatty acid having a melting point of 44° C. or more and a monohydric alcohol containing 3 to 8 carbon atoms. Thus, in accordance with the present invention, by incorporating into the magnetic coating layer a small amount of a highly viscous silicone oil of a high polymerization degree having a specified viscosity and a higher fatty acid ester composed of a higher fatty acid having a melting point of 44° C. or more and a monohydric alcohol containing 3 to 8 carbon atoms, a magnetic tape is provided which provides smooth and stable running performances especially in an environment of high temperature and high humidity and at the same time which is free of "squeal" phenomenon which would otherwise result from the friction of the running magnetic tape with the magnetic heads, tape guides, etc. as well as having good durability against repeated use and long-term storage.

DETAILED DESCRIPTION OF THE INVENTION

The silicone oils used according to the present invention are highly viscous silicone oils represented by the general formula:

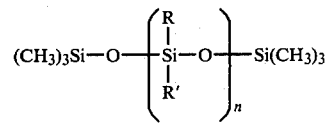

wherein R is CH$_3$, R' is CH$_3$, C$_6$H$_5$ or F and n is a number which determines the viscosity thereof, and having a viscosity of 100,000 centistokes or more. Illustrative of them are dimethyl polysiloxane, methylphenyl polysiloxane, methylfluoro polysiloxane, etc. These silicone oils are well known per se in the art and are commercially available in various grades. In the practice of the present invention, it is essential that the silicone oil to be used is a highly viscous silicone oil having a specified viscosity of 100,000 centistokes or more, or a high degree of polymerization. That is, what is important in the present invention is the viscosity of the silicone oil rather than the type thereof. If the viscosity of the silicone oil is outside the range of the present invention, i.e., lower than 100,000 centistokes, the oil appreciably migrates within the magnetic coating layer of a magnetic tape so that its lubricity effect is not retained over a long period of time and adequate suppression of the "squeal" phenomenon cannot be realized. On the other hand, if the content of the silicone oil in the magnetic coating layer is increased excessively in an attempt to obtain such effect, adverse effects such as exudation thereof onto the surface of the magnetic coating layer, etc. occur.

The higher fatty acid esters used in combination with the highly viscous silicone oils in the present invention are higher fatty acid esters composed of a higher fatty acid having a melting point of 44° C. or more and a monohydric alcohol containing 3 to 8 carbon atoms, which provide high lubricity effect. Illustrative of such esters are butyl myristate, butyl palmitate, propyl stearate, butyl stearate and the like. These higher fatty acid esters may be used alone or in combination.

The highly viscous silicone oils provide outstanding effect in suppressing "squeal" phenomenon but do not necessarily have good, if any, compatibility with binders. Therefore, if such silicone oil is incorporated into the magnetic coating layer in a large amount, there is a possibility that the surface uniformity thereof is adversely affected. However, in accordance with the present invention, by using in combination with other lubricants such as higher fatty acid esters, it has been found that it is possible to restrict the content of the silicone oil to a range wherein the surface uniformity of the magnetic coating layer is not adversely affected and the "squeal" phenomenon can be fully prevented whereby the aimed objects of the present invention can be attained. That is, in the practice of the present invention, a preferable content of a highly viscous silicone oil is 0.2 to 2% by weight on the basis of a binder whereas that of a higher fatty acid ester having a melting point of 44° C. or more is within the range of 0.5 to 3% by weight. On the other hand, if the silicone oil is incorporated into the magnetic coating layer in a large amount (for example, 5% by weight or more) for the purpose of obtaining the advantages of the present invention, it results in unfavourable effects such as surface nonuniformity of the magnetic coating layer, exudation onto the surface thereof which will lead to contamination of the magnetic head, etc. Also, if a higher fatty acid ester which is a lubricant used in combination is incorporated into the magnetic coating layer in a large amount (for example, 5% by weight or more), they exude onto the surface thereof so that adverse effects such as contamination of the magnetic head, etc. occur. By incorporating the silicone oil in an amount of 0.2 to 2% by weight and the higher fatty acid ester in an amount of 0.5 to 3% by weight into the magnetic coating layer in accordance with the present invention, adequate control of "squeal" phenomenon can be attained with no adverse effect such as surface nonuniformity, exudation, etc. of the magnetic coating layer.

Thus, in the present invention, the high viscosity or polymerization degree of the silicone oil used restricts the migration thereof within the magnetic coating layer and the oil permits the magnetic tape to retain its initial characteristics satisfactory even after repeated use or long-term storage. On the other hand, by using the silicone oils in combination with other lubricants such as higher fatty acid esters, it is possible to restrict the amounts of both to a small amount relative to a binder so that the bonding ability of the binder does not decrease and no phenomenon such as extrusion, etc. occurs. Thus there is no adverse effect on the various properties of a magnetic tape.

In the practice of the present invention, in order to incorporate a silicone oil and a higher fatty acid ester into a magnetic coating layer of a magnetic tape, it is convenient to mix them into a coating material during the process for preparation thereof in such an amount that the former is 0.2 to 2% by weight and the latter is 0.5 to 3% by weight on the basis of a binder.

The present invention is illustrated by the following non-restricting examples, which include working examples of the present invention and comparative examples.

WORKING EXAMPLE 1

| | | |
|---|---|---|
| Magnetic ferrous oxide ($\gamma$-Fe$_2$O$_3$) | 100 | Parts by weight |
| Vinyl chloride/vinyl acetate copolymer resin (binder) | 20 | " |
| Polyurethane resin (binder) | 5 | " |
| Silicone oil (dimethyl polysiloxane, 100,000 centistokes) | 0.05–0.5 | " |
| Butyl palmitate | 0.25 | " |
| Methyl ethyl ketone | 120 | " |
| Toluene | 40 | " |
| Cyclohexanone | 40 | " |

The above components were placed into a ball mill and then mixed and dispersed together for 20 hours to prepare a magnetic coating material. The magnetic coating material thus obtained was coated onto a polyethylene terephthalate film having a thickness of 7 $\mu$m in such an amount that the thickness of a dried layer is about 5 $\mu$m, and then was dried. After the drying, the coated surface of the film was subjected to mirror finishing with hot calendering rolls. The film thus obtained was cut into lengths 3.81 mm in width to form an audio cassette tape.

WORKING EXAMPLE 2

A magnetic tape was manufactured as in Working Example 1 except that the silicone oil (100,000 centistokes) of Working Example 1 was replaced by a silicone oil having a viscosity of 300,000 centistokes in an amount varing from 0.05 to 0.25 parts by weight.

COMPARATIVE EXAMPLE 1

A magnetic tape was made following the same procedure as in Working Example 1 except that the silicone oil was omitted.

COMPARATIVE EXAMPLE 2

A magnetic tape was produced as in Working Example 1 except that no butyl palmitate was used.

COMPARATIVE EXAMPLE 3

Repeating the procedure of Working Example 1 except that the amount of the silicone oil used was varied to 1.25 parts by weight, a magnetic tape was obtained.

COMPARATIVE EXAMPLE 4

A magnetic tape was obtained as in Working Example 1 except that the amount of butyl palmitate used was varied to 1.25 parts by weight.

COMPARATIVE EXAMPLE 5

A magnetic tape was made as in Working Example 1 except that in place of the silicone oil (100,000 centistokes) of Example 1, a silicone oil having a viscosity of 10,000 centistokes was used in an amount of 0.5 or 1.5 parts by weight.

Each of the magnetic tapes made in the aforementioned Working Examples and Comparative Examples was loaded and run continuously on a casette tape deck in a high temperature-high humidity environment of 60° C. and 70% RH, and then was determined and evaluated for "squeal" phenomenon, etc. The results obtained are shown in the following table:

| | Amount of lubricant added (Parts by weight) | | Rate of occurrence of squeal (%) | Remarks |
|---|---|---|---|---|
| | Silicone oil | Butyl palmitate | | |
| Working Example 1 | 0.05 | 0.25 | 25 | |
| | 0.25 | 0.25 | 10 | |
| | 0.5 | 0.25 | 0 | |
| Working Example 2 | 0.05 | 0.25 | 10 | |
| | 0.25 | 0.25 | 0 | |
| Comparative Example 1 | — | 0.25 | 100 | |
| Comparative Example 2 | 0.25 | — | 30 | |
| Comparative Example 3 | 1.25 | 0.25 | 5 | Exudation on the tape surface |
| Comparative Example 4 | 0.25 | 1.25 | 80 | Exudation on the |

| | Amount of lubricant added (Parts by weight) | | Rate of occurrence of squeal (%) | Remarks |
|---|---|---|---|---|
| | Silicone oil | Butyl palmitate | | |
| Comparative Example 5 | 0.5 1.5 | 0.25 0.25 | 70 30 | tape surface Exudation on the tape surface |

As seen from the above table, it is possible in accordance with the present invention not only to eliminate the squeal of a magnetic tape and fully ensure stable running performances in an environments of high temperature and high humidity but also to ensure good durability against long-term storage and repeated use.

As discussed above, the present invention has been illustrated with the use of $\gamma$-Fe$_2$O$_3$ as a magnetic powder and of a combination of a vinyl chloride/vinyl acetate copolymer resin with a polyurethane resin as a binder, but it will be obvious that Fe$_3$O$_4$, Co-doped $\gamma$-Fe$_2$O$_3$, Co-doped Fe$_3$O$_4$ and the like may equally be used as a magnetic powder and other conventional resins or their combinations may be used as a binder. It is also possible to include in an magnetic coating material any of antistatic agents (metal soaps, tertiary ammonium salts, etc.), dispersing agents (aliphatic acid esters, phosphate esters, higher alcohols, etc.). etc. which are conventionally used as additives in the art.

What we claim is:

1. A magnetic recording medium comprising a base material and a magnetic coating layer thereon, said magnetic coating layer containing a binder, a highly viscous silicone oil having a viscosity of at least 100,000 centistokes and a higher fatty acid ester composed of a higher fatty acid having a melting point of at least 44° C. and a monohydric alcohol containing 3 to 8 carbon atoms, said silicone oil in an amount of 0.2% to 2.0% by weight of said binder and said higher fatty acid ester in an amount of 0.5% to 3.0% by weight of said binder.

2. A magnetic recording medium as defined in claim 1 or wherein the silicone oil has a viscosity of 300,000 centistokes.

3. A magnetic recording medium as defined in claim 1 wherein the higher fatty acid ester is selected from butyl myristate, butyl palmitate, propyl stearate, butyl stearate and the like.

4. A magnetic recording medium as defined in claim 3 wherein the higher fatty acid ester is butyl palmitate.

5. A magnetic recording medium as defined in claim 1 wherein the binder is a combination of a vinyl chloride/vinyl acetate copolymer resin with a polyurethane resin.

6. A magnetic recording medium as defined in claim 1 wherein the base material is a flexible plastics film.

7. A magnetic recording medium as defined in claim 1 wherein the magnetic coating layer further contains an antistatic agent and a dispersing agent which are conventionally used in the art.

8. A magnetic recording medium comprising a base material and a magnetic coating layer thereon, said magnetic coating layer containing a binder, the highly viscous silicone oil having a viscosity of at least 100,000 centistokes and a higher fatty acid ester composed of a higher fatty acid having a melting point of at least 44° C. and a monohydric alcohol containing 3 to 8 carbon atoms, said silicone oil being represented by the general formula:

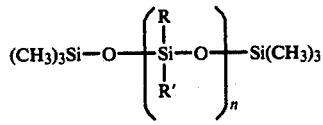

wherein R is CH$_3$, R' is CH$_3$, C$_6$H$_5$ or F and n is a number which determines the viscosity thereof, said silicone oil in an amount of 0.2% to 2.0% by weight of said binder and said higher fatty acid ester in an amount of 0.5% to 3.0% by weight of said binder.

9. A magnetic recording medium as defined in claim 8 wherein the silicone oil is a dimethyl polysiloxane having a viscosity of 100,000 centistokes.

10. A magnetic recording medium as defined in claim 8 wherein the silicone oil is a dimethyl polysiloxane having a viscosity of 300,000 centistokes.

* * * * *